United States Patent

Whalen

[11] Patent Number: 6,035,936
[45] Date of Patent: Mar. 14, 2000

[54] VISCOELASTIC SURFACTANT FRACTURING FLUIDS AND A METHOD FOR FRACTURING SUBTERRANEAN FORMATIONS

[76] Inventor: Robert T. Whalen, 2135 Arlington Ave., Baton Rouge, La. 70808

[21] Appl. No.: 08/965,582

[22] Filed: Nov. 6, 1997

[51] Int. Cl.$^7$ .................................................. E21B 43/26
[52] U.S. Cl. .......................... 166/308; 166/280; 507/266; 507/922
[58] Field of Search ..................................... 166/308, 280; 507/245, 254, 255, 261, 266, 922

[56] References Cited

U.S. PATENT DOCUMENTS

| | | | |
|---|---|---|---|
| 4,432,881 | 2/1984 | Evani | 252/8.5 A |
| 4,541,935 | 9/1985 | Constein et al. | 252/8.5 R |
| 4,615,825 | 10/1986 | Teot et al. | 252/356 |
| 4,960,821 | 10/1990 | Peiffer | 524/534 |
| 5,036,136 | 7/1991 | Peiffer | 524/812 |
| 5,066,753 | 11/1991 | Peiffer | 526/310 |
| 5,258,137 | 11/1993 | Bonekamp et al. | 252/356 |
| 5,551,516 | 9/1996 | Norman et al. | 166/308 |
| 5,582,250 | 12/1996 | Constein | 166/280 |

FOREIGN PATENT DOCUMENTS 1298697  4/1992  Canada .

OTHER PUBLICATIONS

Brown, J. Ernest, King, Lee R., Nelson, Erik B., Schulumberger Dowell, and Ali, Syed A., Chevron U.S.A., "Use of Viscoeleastic Carrier Fluid in Frac–Pack Applications", Society of Petroleum Engineers Paper 31.114, pp. 439–441, 1996.

*Primary Examiner*—William Neuder
*Attorney, Agent, or Firm*—Domingue & Waddell, PLC

[57] ABSTRACT

Viscoelastic surfactant fluids for fracturing subterranean formations penetrated by a wellbore. The surfactant fluids are comprised of an aqueous medium; an effective amount of an inorganic water soluble salt; and an effective amount of at least one surfactant selected from the group consisting of: i) anionic surfactants; ii) nonionic surfactants; and iii) hydrotropic surfactants. The surfactant compositions can be further stabilized and the viscosity increased by the addition of one or more hydrophobic organic alcohols. This invention also relates to a method for fracturing subterranean formations using said viscoelastic surfactant fluids.

16 Claims, No Drawings

VISCOELASTIC SURFACTANT FRACTURING FLUIDS AND A METHOD FOR FRACTURING SUBTERRANEAN FORMATIONS

FIELD OF THE INVENTION

This invention relates to viscoelastic surfactant fluids for fracturing subterranean formations penetrated by a wellbore. The surfactant fluids are comprised of an aqueous medium; and an effective amount of at least one surfactant selected from the group consisting of: i) anionic surfactants; ii) nonionic surfactants; and iii) hydrotropic surfactants. The surfactant fracturing fluids can be further stabilized, and their viscosity increased, by the addition of one or more hydrophobic organic alcohols. This invention also relates to a method for fracturing subterranean formations using said viscoelastic surfactant fluids.

BACKGROUND OF THE INVENTION

Hydraulic fracturing is used by the petroleum industry to increase well productivity or injectivity by creating highly conductive paths some distance from the wellbore into the formation. The fracturing is created by injecting suitable fluids into the well under pressure until the reservoir rock fractures. In order to create a fracture, enough energy must be provided to overcome the native overburden pressures which then causes failure, or fracture, of the reservoir material. The fracturing fluid usually carries a proppant, such as 20–40 mesh sand, bauxite, glass beads, and the like, suspended in the fracturing fluid and transported into the fracture. The proppant then keeps the newly formed fractures from closing when the pressure is released.

Hydraulic fracturing has been used for many years and a variety of fluids have been developed over the years that can withstand the high pump rates, shear stresses, and high temperatures and pressures a fracturing fluid is often exposed to. Most of the fracturing fluids used today are aqueous based gels, emulsions, or foams.

Common gelling agents for water based fracturing fluids are high molecular weight polymers, such as borate-crosslinked guar/hydroxypropyl guar (HPG), hydroxyethylcellulose (HEC), and polyacrylamides. Carboxymethylhydroxy guar cross-linked with zirconium has been used for high temperature wells. See *Frac Pack Technology Still Evolving, Oil and Gas Journal.* Oct. 23, 1995, pp. 60–70. The ability of a fluid to effectively carry proppant is dependent on such things as the viscosity and density of the fluid. Small amounts of polymers can greatly thicken aqueous based fluids. At relatively low temperatures an aqueous liquid thickened with only polymers will normally have sufficient viscosity to suspend the proppant during the fracturing process. On the other hand, at higher temperatures, the viscosity is greatly decreased and it is necessary to crosslink the polymer with borate, or other metal ions, to maintain sufficient viscosity. Borate crosslinked guar fluids using less than 30 pounds guar per 1000 gallons of fluid have been used successfully in formations up to 135° C. Such fluids can be effective up to temperatures of 177° C. with increased guar loadings A disadvantage associated with the above systems is related to the high molecular weight polymer solids which are often cross-linked to further increase molecular weight. The resulting high molecular weight polymers will typically contain insoluble materials that tend to filter out in the formation, or fractures, after the fracturing treatment. This reduces the conductivity or permeability of the formation and results in decreased well productivity. Expensive and often corrosive reagents, known as breakers, are commonly used to destroy the molecular backbone of these polymers, reducing the molecular weight, making it more soluble in surrounding fluids. This makes it easier to remove from the formation. Agents used as breakers are typically oxidizers or enzymes, but they are only partially effective. For example, cleanup of the polymer is typically less than about 80% and in many cases less than about 50%.

There are also foamed fracturing fluids which are commonly comprised of 75–80% gaseous nitrogen and 20–25% water or fluids. The ratio of the components affects the viscosity of the fluid. Foamed fracturing fluids are relatively clean, have good proppant suspension and carrying capabilities, and provide relatively easy cleanup of formation and fractures. The cost of foamed fracturing fluids is more attractive in shallow to medium depth wells because less liquids and additives are required. They become less cost effective at increased depths because more nitrogen is needed to produce foam at greater pressures. Further, more pumping horsepower is required at greater depths to compensate for the relatively low fluid density of the material that is being injected to overcome the relatively high fracturing pressures. In some cases it may not be possible to get the desired maximum proppant concentrations because the proppant must be blended with the fluid portion of the foam before being mixed with the gas.

A new type of fracturing fluid, a viscoelastic surfactant system, is described in U.S. Pat. No. 5,551,516, which is incorporated herein by reference. The system is described as having a texture similar to that of gelatin, making it an excellent particle suspension medium. Such systems are typically comprised of a water soluble salt, such as an ammonium or potassium chloride, and an organic stabilizing additive selected from the group of organic salts such as sodium salicylate, thickened by the addition of 1 to 8 wt. % of various cationic quaternized ammonium surfactants. The use of cationic quaternized ammonium surfactants as thickening agents with these salts is said to be stable to temperatures of about 110°C. This viscoelastic surfactant system is described as being solids-free and having good viscosity and proppant transport capabilities. It also presents less of a cleanup problem of formation fractures when compared to polymer based systems. The viscoelastic surfactant fracturing fluid can be broken by contact with formation water or oil and needs no internal breakers to reduce viscosity so that it can be removed cleanly from the formation.

A potential problem with the above described viscoelastic surfactant system is that cationic surfactants can oil-wet formation rocks, thereby increasing the resistance of the oil flow through formation pore throats which are restricted by oil covered surfaces. It is generally felt that a water wet formation is more beneficial for production than an oil wet formation. Application of the above viscoelastic surfactant system is also restricted to temperatures below about 110° C., and it appears to be most effective at temperatures below about 80° C. Published literature reporting on the above system shows a dramatic drop in viscosity at temperatures above 80° C. (SPE Publication #31114, February 1996). Many formations being drilled and fractured today have temperatures exceeding 110° C.

Although various fracturing fluid formulations are presently used, there is still a need for improved fracturing fluids which do not have the disadvantages of either the polymer system that can damage the formation, or the disadvantage of the cationic viscoelastic surfactant systems which can undesirably oil-wet the formation rocks. There is also a need for fracturing fluids which are stable at elevated temperatures, especially at temperatures in excess of 110° C.

SUMMARY OF THE INVENTION

In accordance with the present invention, there is provided a viscoelastic surfactant fracturing fluid composition comprised of an effective amount of one or more surfactants selected from the group consisting of anionic, nonionic, and hydrotropic surfactants, in an aqueous medium.

In a preferred embodiment of the present invention, the anionic surfactant is selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols. Preferred are alkyl sulfates and alpha olefin sulfates, dodecylbenzene sulfonic acid, and linear and branched alkyl benzene sulfonates.

In another preferred embodiment of the present invention the nonionic surfactant is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}+$ alcohols, polyethylene glycols of all molecular weights, and reactions and polypropylene glycols of all molecular weights and reactions.

In yet another preferred embodiment of the present invention the hydrotropic surfactant is selected from the group consisting of dicarboxylic acids, phosphate esters, sodium xylene sulfonate, sodium dodecyl diphenyl ether disulfonate.

In another preferred embodiment of the present invention the fracturing fluid contains a hydrophobic organic alcohol component selected from the group consisting of ethanol, diethanol, and propanol alcohol ethers, $C_4$–$C_{20+}$ linear alcohols, ethylbenzyl alcohol, 2-propanol, 2-ethyl-1-hexanol, 1-octanol, and 2-octanol, and mixtures thereof In still another preferred embodiment of the present invention, there is also provided an aqueous salt solution which can be seawater or a solution of a salt selected from potassium chloride, ammonium chloride, sodium chloride, calcium chloride, and magnesium chloride.

In a preferred embodiment, the fracturing fluid contains one or more proppant materials selected from the group consisting of gravel, sand, bauxite, glass beads, and the like..

Also in accordance with the present invention, there is provided a method of fracturing a subterranean well formation comprising the steps of:

i) providing a viscoelastic surfactant fracturing fluid comprised of an effective amount of one or more surfactants selected from the group consisting of anionic, nonionic, and hydrotropic surfactants in an aqueous medium; and ii) pumping said fracturing fluid through a wellbore and into a subterranean formation at a pressure sufficient to fracture the formation.

In a preferred embodiment of the present invention the formation is first stabilized with an effective amount of an inorganic water soluble salt capable of inhibiting hydration.

In another preferred embodiment of the present invention there is also present an effective amount of a hydrophobic organic alcohol.

DETAILED DESCRIPTION OF THE INVENTION

As previously mentioned, the viscoelastic fracturing fluids of the present invention are comprised of an effective amount of at least one or more surfactants, or thickening agents, which surfactants are selected from the group consisting of: i) anionic surfactants; ii) nonionic surfactants; and iii) hydrotropic surfactants; in a aqueous medium. The fracturing fluids of the present invention can also contain an effective amount of one or more hydrophobic organic alcohols. That is, an organic alcohol that is immisible with water.

The fracturing fluids of the present invention, which are typically in the form of an emulsion, are characterized in that they: a) are not damaging to the subterranean formation; b) are able to maintain a relatively high viscosity with good proppant transport properties across a wide range of temperatures, up to, and in excess of, about 150° C.; c) are capable of being used in both fresh and salt water environments; d) can be used without the addition of solids; and e) can be left in the formation after fracturing, to be broken by insitu water and oil, without fear of damage to the formation.

The surfactant based fluids of the present invention are highly stable with high viscosity across a relatively wide temperature range, thereby making them superior hydraulic fracturing fluids for subterranean formations. They can be broken by intrusion of water or oil and removed from the formation leaving little or no residue that could damage the formation. By careful design, these fluids can be specifically tailored to give characteristics of viscosity, solubility and temperature stability suited to specific applications.

In a preferred embodiment of the present invention, the most desirable characteristics of the fracturing fluids of the present invention are their high viscosity across a wide range of temperatures, particularly at the high end of the temperature range (about 150° C.), and at the low surfactant loading, which reduces cost. They are also effective in a number of salt brines, including seawater needed to effect formation stability. Fracturing fluids of the present invention which contain two or more different surfactants are particularly stable at the higher temperatures. The surfactants used herein are preferably anionic or nonionic, thereby leaving reservoir rocks water-wet for better fluid mobility through the formation, thus enhancing well production.

In its simplest form, the fracturing fluids of the present invention need only contain an effective amount of any one or more surfactants selected from anionic, nonionic, and hydrotropic surfactants in water. The term "effective amount" as used herein means that minimum amount of surfactant that will produce the desired characteristics, particularly viscosity, in any given formation. Non-limiting examples of anionic surfactants suitable for use herein include those selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols. Preferred are alkyl sulfates and alpha olefin sulfates, dodecylbenzene sulfonic acid, and linear and branched alkyl benzene sulfonates. More preferred are dodecylbenzene sulfonic acid, and linear and branched alkyl benzene sulfonates.

Non-limiting examples of nonionic surfactants suitable for use herein include those selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear $C_4$ to $C_{20}+$ alcohols, polyethylene glycols of all molecular weights and reactions, and polypropylene glycols of all molecular weights and reactions. Preferred are ethoxylated octyl phenols, polypropylene glycols, ethoxylated linear alcohols, and ethoxylated nonyl phenols. More preferred are ethoxylated linear alcohols, and ethoxylated nonyl phenols.

Non-limiting examples of hydrotropic surfactants suitable for use herein include those selected from the group consisting of dicarboxylic acids, phosphate esters, sodium xylene sulfonate, and sodium dodecyl diphenyl ether disulfonate. Preferred are phosphate ethers.

As previously stated, the surfactant of the present invention is employed in an effective amount. That is, at least that amount which in combination with the other ingredients, is sufficient to provide a viscosity high enough to achieve the desired degree of fracturing of the formation, even at formation temperatures at, or in excess of, 150° C. If a proppant is used, the amount of surfactant must be sufficient to maintain the proppant particles in suspension during their placement in the formation fractures. The exact quantity and specific surfactant, or combination of surfactants to be employed will vary depending on such things as the viscosity desired, the temperature of the formation, the desired pH of the solution, as well as other factors, such as the concentration of and specific soluble salt(s), if any, used in the fracturing fluid composition. The concentration of the surfactant will typically range from about 1 to about 30 wt. %, preferably from about 5 to about 15 wt. %, based on the total weight of the fracturing fluid composition. Simple laboratory procedures can be used to determine the optimum conditions for any particular set of parameters.

The fracturing fluids of the present invention can be further stabilized, and their viscosity increased, by the addition of organic alcohols which are substantially hydrophobic. Non-limiting examples of such alcohols include the $C_4$ to $C_{20+}$ hydrophobic alcohols, preferably the $C_8$ to $C_{16}$ alcohols. Preferred are linear alcohols, more preferred are those selected from the group consisting of ethanol, diethanol, and propanol alcohol ethers, ethylbenzyl alcohol, 2-propanol, 2-ethyl-1-hexanol, 1-octanol, and 2-octanol, and mixtures thereof Most preferred are 2-ethyl-1-hexanol, 1-octanol, and 2-octanol.

An effective amount of at least one water soluble inorganic salt can be used in said fracturing fluids to effect formation stability by inhibition of clay hydration and swelling. By effective amount we mean at least that minimum amount to achieve formation stability. Typically an effective amount will be from about 1 wt. % to about 4 wt. % salt, based on the total weight of salt and water.

Optionally, the formation can first be treated with the salt solution prior to introduction of the fracturing fluids, which may or may not contain salt. Non-limiting examples of preferred water soluble salts suitable of use herein include those selected from the group consisting of potassium chloride; ammonium chloride, sodium chloride, calcium chloride, and magnesium chloride. Naturally occurring brines and seawater can be employed as well. In addition, the aqueous fluid may also contain other soluble salts of, for example, zinc, lithium, chromium, iron, copper, and the like. Preferably, seawater, and inorganic chlorides and/or bromides are employed, but other salts such as sulfates, nitrates, etc. can be used. The only restriction is that the salts must be compatible with the particular thickening agent. By compatible it is meant, for example, that the salt does not detrimentally interfere with the thickening function of the thickening agent and/or produce undesirable quantities of precipitates. Examples of useful water soluble salts are also disclosed U.S. Pat. No. 2,898,294, which is incorporated herein by reference.

Although the fracturing fluids of the present invention can be used alone to fracture the formation, it is within the scope of this invention that a sufficient quantity of a proppant can be used with the fracturing fluids. Non-limiting examples of suitable proppants include gravel, sand, bauxite, glass beads, and the like. It is preferred that the particle size of the proppant be from about 20 to about 40 mesh. The resulting fluid slurry may have a weight of particulate material per gallon of slurry ranging from as low as about 1 ppg, up to about 20 ppg, preferably from about 5 ppg to about 20 ppg. Ppg is pounds of proppant to gallons of fracturing fluid.

The viscoelastic fracturing fluids of the present invention can be prepared in any suitable manner. For example, the surfactant(s) can be blended in water to the desired viscosity. The hydrophobic organic alcohol, and or salt solution, can then be added. The fracturing fluids can also be prepared by adding the surfactants to a salt solution to which the organic alcohol has already been, or will be, added. Thus, the order in which the components of the fracturing fluid are added is not important as long as the desired results are achieved. Standard mixing techniques can be used since heating of the solution and special agitation conditions are not critical to the practice of the present invention. Of course, certain extreme conditions, such as the practice of the present invention in very cold climates will warrant heating the solution.

In addition to the water soluble salts and surfactants and high molecular weight alcohols described hereinabove, the fluids may also contain conventional constituents which perform specific desired functions, e.g., corrosion inhibitors, fluid loss additives, and the like. The proppant can then be suspended in the fluid producing the desired package. The fracturing fluid may optionally contain a gas such as air, nitrogen or carbon dioxide to provide an energized fluid or a foam.

A formation is fractured by use of the fracturing fluids of the present invention by any conventional technique. Typically, the fracturing fluid would be injected into the wellbore al: a pressure that will overcome the native overburden pressure of the formation, thus resulting in fracturing. It is preferred that the well first be treated with the aforementioned salt solution to help stabilize the formation prior to injection of the fracturing fluids.

The following examples are presented for illustrative purpose only and are not to be interpreted as limiting the invention in any way. The surfactants were selected and the appropriate ratios determined, then the surfactants were mixed into a single liquid concentrate before being added to the salt brine. The hydrophobic organic alcohol was added to the fracturing fluid mixture after the surfactants were added to the brines (salt solution), but said alcohol may also have been incorporated into the fracturing fluid mixture prior the introduction of the salt brine.

EXAMPLE 1

Various surfactants were tested at various ratios and chosen for inclusion in a single surfactant concentrate formula designated as VEES #5. VEES #5 surfactant concentrate is comprised of four surfactants:

1. Dodecylbenzene Sulfonic Acid (sodium salt)—anionic—60% by volume.

2. Alkyl Phenol Phosphate Ester—hydrotropic—10% by volume.

3. Ethoxylated Nonyl Phenol (6 mols Ethylene Oxide (EO) per mol of nonyl phenol)—nonionic—10% by volume.

4. Ethoxylated $C_{12}$ Primary Linear Alcohol (5 mols EO per mol of alcohol)—nonionic—20% by volume.

VEES #5 surfactant concentrate was then blended into seawater at volume ratios of 13%, 14% and 15% surfactant to seawater. To this emulsion was added 2-ethyl-1-hexanol alcohol at a ratio equal to 20% by volume of the surfactant. The resulting emulsions were then run using a Fann 50 Rheometer for rheological measurements over a wide range of temperatures. The results are given in the table below.

| Fluid Viscosity (cp) @ 100 sec1-in Gulf of Mexico Seawater | | | |
|---|---|---|---|
| Temp. ° C. | 13% VEES #5 | 14% VEES #5 | 15% VEES #5 |
| 55 | 175 | 277 | 270 |
| 66 | 175 | 211 | 218 |
| 77 | 178 | 193 | 205 |
| 88 | 172 | 186 | 195 |
| 99 | 150 | 175 | 191 |
| 110 | 129 | 164 | 181 |
| 121 | 111 | 150 | 177 |
| 132 | 88 | 139 | 160 |
| 143 | 47 | 77 | 107 |

EXAMPLE 2

VEES #5 surfactant concentrate was blended into a 3 wt. % ammonium chloride in water solution at volume ratios of 13%, 14% and 15% surfactant to brine solution. The resulting emulsions were then run using a Fann 50 Rheometer for rheological measurements over a wide range of temperatures. The results are given below.

Fluid Viscosity (cp) @ 100 sec1—in 3% Ammonium Chloride Solution

| Temp.° C. | 13% VEES #5 | 14% VEES #5 | 15% VEES #5 |
|---|---|---|---|
| 55 | 189 | 244 | 318 |
| 66 | 179 | 193 | 288 |
| 77 | 175 | 182 | 250 |
| 88 | 164 | 172 | 225 |
| 99 | 161 | 172 | 225 |
| 110 | 154 | 164 | 210 |
| 121 | 136 | 143 | 189 |

-continued

| Temp.° C. | 13% VEES #5 | 14% VEES #5 | 15% VEES #5 |
|---|---|---|---|
| 132 | 122 | 125 | 170 |
| 143 | 80 | 95 | 100 |
| 154 | 50 | — | — |

VEES #5 surfactant concentrate was blended into a 2 wt. % aqueous potassium chloride solution at volume ratios of 13%, 14%, and 15% surfactant to brine. To this emulsion was added 2-ethyl-1-hexanol alcohol at a ratio equal to 20% by volume of the surfactant. The resulting emulsions were then run using a Fann 50 Rheometer for rheological measurements over of temperatures. The results are given below.

| Fluid Viscosity (cp) @ 100 sec1-in 2% Ammonium Chloride Solution. | | | |
|---|---|---|---|
| Temp. ° C. | 13% VEES #5 | 14% VEES #5 | 15% VEES #5 |
| 55 | 383 | 460 | 620 |
| 66 | 300 | 392 | 500 |
| 77 | 263 | 317 | 383 |
| 88 | 244 | 288 | 350 |
| 99 | 250 | 292 | 367 |
| 110 | 212 | 263 | 275 |
| 121 | 107 | 110 | 200 |
| 132 | — | — | 27 |
| 143 | — | — | — |

EXAMPLE 4

Various surfactants tested at various ratios and chosen for inclusion in a single surfactant concentrate formula designated here as VES #1. VES #1 surfactant concentrate is comprised of three surfactants:

1. Ethoxlated Nonyl Phenol (9.5 mols EO per mol of nonyl phenol)—nonionic—65 vol. %.

2. Oxyalkylated Poly Propylene Glycol (approx. mol. wt. of 4,000)—nonionic—10 vol. %.

3. Alkyl Phenol Phosphate Ester—hydrotropic—25 vol. %.

VES #1 surfactant concentrate was then blended into seawater at a volume ratio of 25% surfactant to seawater. To this emulsion was added 2-ethyl-1-hexanol alcohol at a ratio equal to 25% vol. % of the surfactant. The resulting emulsion was then run using a Fann 50 Rheometer for rheological measurements over a wide range of temperatures. The results are given below.

| Fluid Viscosity (cp) @ 100 sec1-in Gulf of Mexico Seawater | |
|---|---|
| Temp. ° C. | 25 vol. % VES #1 |
| 66 | 586 |
| 77 | 375 |
| 88 | 244 |
| 99 | 172 |
| 104 | 111 |

EXAMPLE 5

Various surfactants were tested at various ratios and chosen for inclusion in a single surfactant concentrate formula designated here as VES #2. VES #2 surfactant concentrate is comprised of three surfactants:

1. Ethoxlated Nonyl Phenol (9.5 mols EO per mol of nonyl phenol)—nonionic—30 vol. %.

2. Dodecylbenzene Sulfonic Acid (sodium salt)—anionic—40% by volume.
3. Alkyl phenol phosphate Ester—hydrotropic—30 vol. %.

VES #1 surfactant concentrate was then blended into seawater at a volume ratio of 17.5% surfactant to seawater. To this emulsion was added 2-ethyl-1-hexanol alcohol at a ratio equal to 20% vol. % of the surfactant. The resulting emulsion was then run using a Fann 50 Rheometer for rheological measurements over a wide range of temperatures. The results are given below.

| Fluid Viscosity (cp) @ 100 sec1-in Gulf of Mexico Seawater | |
| --- | --- |
| Temp. ° C. | 17.5 vol. % VES #2 |
| 130 | 505 |
| 150 | 310 |
| 170 | 312 |
| 190 | 281 |
| 210 | 225 |

What is claim is:

1. A method of fracturing a subterranean well formation comprising the steps of:
   i) providing a viscoelastic surfactant fracturing fluid composition comprised of an effective amount of one or more surfactants selected from the group consisting of anionic, nonionic, and hydrotropic surfactants and one or more hydrophobic organic alcohols, in an aqueous medium, wherein said surfactant fracturing fluid composition is substantially free of polymer; and
   ii) pumping said fracturing fluid composition through a wellbore and into a subterranean formation at a pressure sufficient to fracture the formation.

2. The composition of claim 1 wherein the anionic surfactant is selected from the group consisting of alkyl sulfates, alkyl ether sulfates, alkyl ester sulfonates, alpha olefin sulfonates, linear alkyl benzene sulfonates, branched alkyl benzene sulfonates, linear dodecylbenzene sulfonates, branched dodecylbenzene sulfonates, alkyl benzene sulfonic acids, dodecylbenzene sulfonic acid, sulfosuccinates, sulfated alcohols, ethoxylated sulfated alcohols, alcohol sulfonates, ethoxylated and propoxylated alcohol sulfonates, alcohol ether sulfates, ethoxylated alcohol ether sulfates, propoxylated alcohol sulfonates, sulfated nonyl phenols, ethoxylated and propoxylated sulfated nonyl phenols, sulfated octyl phenols, ethoxylated and propoxylated sulfated octyl phenols, sulfated dodecyl phenols, ethoxylated and propoxylated sulfated dodecyl phenols.

3. The method of claim 2 wherein the anionic surfactant is selected from the group consisting of alkyl sulfates and alpha olefin sulfates, dodecylbenzene sulfonic acid, and linear and branched alkyl benzene sulfonates.

4. The method of claim 3 wherein the anionic surfactant is selected from dodecylbenzene sulfonic acid, and linear and branched alkyl benzene sulfonates.

5. The composition of claim 1 wherein the nonionic surfactant is selected from the group consisting of amine oxides, ethoxylated or propoxylated nonyl phenols, ethoxylated or propoxylated alkyl phenols, ethoxylated or propoxylated octyl phenols, ethoxylated or propoxylated dodecyl phenols, ethoxylated or propoxylated primary linear alcohols from $C_4$ to $C_{20}+$, polyethylene glycols of all molecular weights and reactions and polypropylene glycols of all molecular weights and reactions.

6. The method of claim 5 wherein the nonionic surfactant is selected from ethoxylated octyl phenols, polypropylene glycols, ethoxylated linear alcohols, and ethoxylated nonyl phenols.

7. The method of claim 6 wherein the nonionic surfactant is selected from ethoxylated linear alcohols, and ethoxylated nonyl phenols.

8. The method of claim 6 wherein the fracturing fluid also contains a hydrophobic $C_4$ to $C_{20+}$ alcohol selected from the group consisting of ethanol, diethanol, and propanol alcohol ethers, ethylbenzyl alcohol, 2-propanol, 2-ethyl-1-hexanol, 1-octanol, and 2-octanol, and mixtures thereof.

9. The method of claim 8 wherein the organic alcohol is 2-ethyl-1-hexanol.

10. The method of claim 1 wherein the hydrotropic surfactant is selected from the group consisting of dicarboxylic acids, phosphate esters, sodium xylene sulfonate, and sodium dodecyl diphenyl ether disulfonate.

11. The method of claim 1 wherein the hydrophobic organic alcohol is selected from the group consisting of ethanol, diethanol, and propanol alcohol ethers, ethylbenzyl alcohol, 2-propanol, 2-ethyl-1-hexanol, 1-octanol, and 2-octanol, and mixtures thereof.

12. The method of claim 1 wherein the formation is first treated with an inorganic water soluble salt solution which is effective for at least partially stabilizing the subterranean well formation.

13. The method of claim 12 wherein the salt solution is selected from seawater and solutions of salts selected from potassium chloride, ammonium chloride, and sodium chloride.

14. The method of claim 1 wherein the fracturing fluid also contains an effective amount of an inorganic water soluble salt solution which is effective for at least partially stabilizing the subterranean well formation.

15. The method of claim 14 wherein the salt solution is selected from seawater and solutions of salts selected from potassium chloride, ammonium chloride, sodium chloride, calcium chloride, and magnesium chloride.

16. The method of claim 1 wherein the fracturing fluid also contains a proppant selected from gravel, sand, bauxite, and glass beads.

* * * * *